UNITED STATES PATENT OFFICE.

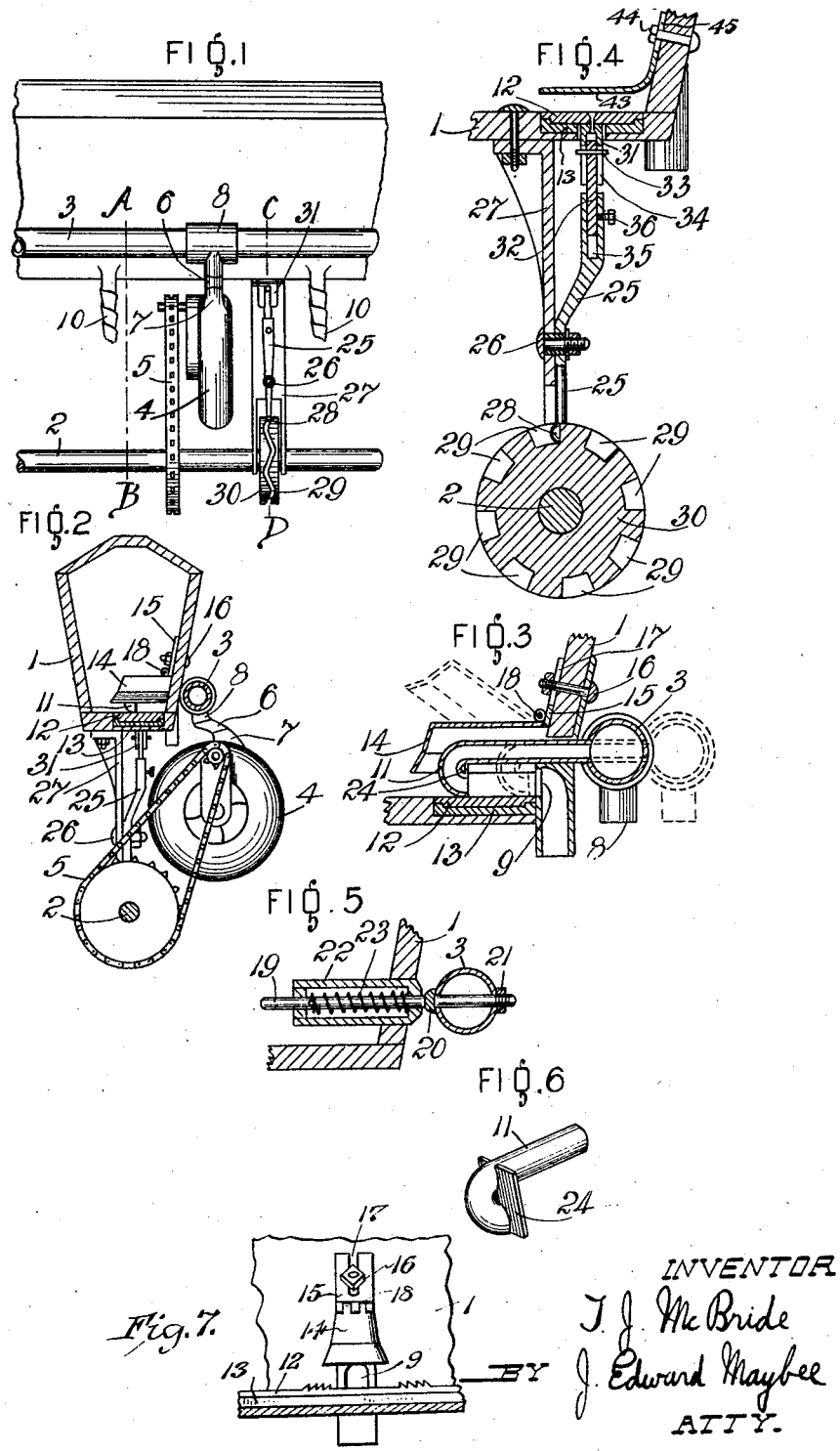

THOMAS JAMES McBRIDE, OF CHRISTCHURCH, NEW ZEALAND.

AIR GRAVITY SEEDING DEVICE FOR DRILLS AND OTHER SOWING IMPLEMENTS.

1,407,795.   Specification of Letters Patent.   Patented Feb. 28, 1922.

Application filed August 14, 1919. Serial No. 317,532.

*To all whom it may concern:*

Be it known that I, THOMAS JAMES MC-BRIDE, a British subject, residing at 15 St. Albans Street, Christchurch, in the Dominion of New Zealand, have invented new and useful Improvements in and Relating to Air Gravity Seeding Devices for Drills and other Sowing Implements, of which the following is a specification.

This invention relates to an air and gravity or gravity feeding device for supplying grain and seed of various kinds and the like from the hopper of a drill or other sowing implement to the coulters or other sowing means in the required quantity, the object of the present invention being to provide a simple construction for the purpose capable of being satisfactorily operated with but a small expenditure of air or by gravity alone.

In carrying this object into effect the present invention consists briefly of the provision of a series of outlets communicating between the lower portion of the seed-box or hopper of the drill and the coulters or other sowing means, an air supply pipe extending parallel with such hopper and having a corresponding series of nozzles adapted to deliver blasts of air across the bottom of the hopper to the said outlets, and a conveyor, or series of conveyors, arranged in the bottom of the hopper and adapted to carry the seed of other material to be sown between said nozzles and their corresponding outlets.

The invention includes means for varying the space between the nozzles and the outlets for the purpose of regulating the amount of seed or material to be sown, and it includes also hoods or covers arranged over the nozzles and outlets, such hoods being adjustable in a vertical direction for the purpose of regulating the admission of seed of various sizes and in various quantities to a position convenient for discharge through the outlets and in front of the jets.

In order that the nature of the invention and its construction may be clearly understood, reference will now be made to the accompanying drawings in which;—

Figure 1. is a rear view of the central portion of a drill illustrating an application of the present invention thereto.

Figure 2. is a cross-section along the line A—B in Figure 1.

Figure 3. is a sectional view of one of the feeding devices.

Figure 4. is a cross-section on the line C—D in Fig. 1 illustrating the form and operation of the conveyor.

Figure 5. is a sectional view showing, by way of example, a method of mounting the air supply pipe and providing for the required movement thereof.

Figure 6. is a perspective view of one of the nozzles as in Figures 2 and 3.

Figure 7 is a vertical section on a line through bar 12 of Figure 3.

Referring first to Figures 1 and 2, 1 is the seed box or hopper of a drill or the like, and 2 is the main shaft which is rotated by the carrying wheels of such implement as customary.

According to the present invention a pipe 3 is provided and mounted so as to extend parallel with the hopper 1.

The said pipe 3, which may be positioned either inside or outside the hopper, is supplied with a volume of air from any suitable source such for instance as a blower 4 operated by means of appropriate gearing 5 from the main shaft 2.

The means for delivering the air from the blower 4 to the pipe 3 consists of a flexible tube 6 connecting the outlet 7 of the blower with a T, 8, upon the said pipe 3.

Formed through the front or rear sides of the hopper 1, at or near the bottom of the latter, are a series of outlets 9 giving access from such hopper to the grain-tubes 10 which communicate with the coulters or other sowing means.

The said air-supply pipe 3 is provided with a plurality of nozzles 11 (one for each of the outlets 9) such nozzles being adapted to deliver blasts of air across the bottom of the hopper into their corresponding outlets 9, In the construction shown in Figures 1, 2 and 3, the nozzles 11 are introduced into the hopper at the same side as that in which the outlets 9 are situated and consequently the extremities of such nozzles are curved round to give them the required direction. In the event of their being introduced through the opposite side of the hopper to that of the outlets however, it will be understood that such nozzles will be straight or curved slightly near the outlet.

In the bottom of the hopper and extending parallel therewith beneath the nozzles 11 is a bar 12 (Figures 2, 3 and 4) which is slidably received in a suitable seating or bearing 13, of channel or U-section, and which is recessed into the bottom of the hopper to the necessary depth to bring the upper surface of the bar 12 practically flush with the bottom of the hopper as here shown.

The said bar 12, or conveyor as it will hereinafter be termed, is slightly serrated, at least adjacent the shields 14 (see Fig. 7) and is caused to operate with a reciprocal motion. Being situated in the bottom of the hopper the conveyor will receive by gravity the grain or other material contained in such hopper while, by its said reciprocal motion such conveyor will serve to carry the said material between the nozzles 11 and the outlets 9 in which position such material will be impinged by the blasts and discharged through the outlets 9.

Arranged above each of the nozzles 11 (Figures 2 and 3) is a hood or cover 14 adapted to regulate the quantity of seed carried by the conveyor 12 to the said position between such nozzle and the outlet.

For this purpose each of the said hoods is mounted by means of a plate 15 secured to the side of the hopper 1 by a bolt or the like 16 passing through a slot 17 in such plate which permits of the hood being adjusted in a vertical direction so as to place its lower edge at any desired space above the conveyor 12. In practice this space will be adjusted according to the size and quantity of the seeds or material to be sown, so as to permit of the latter entering the said position in the form of a single layer, owing to the slope of the wall of the hopper the adjustment of the shields or hoods is both vertical and horizontal.

To enable the setting of the hood to be easily arrived at, suitable graduations may be provided upon the plate 15 or the side of the hopper so as to indicate the correct position of the hood when sowing seeds of various kinds and sizes.

To give free access to the nozzles for inspection and other purposes the attachment of the hood 14 to the slotted plate 15 may be by means of a hinge 18 which permits of such hood being raised as indicated in dotted lines Figure 3.

The amount of seed or the like, discharged through the outlets 9 by the blasts is determined by the space between the nozzles 11 and such outlets since by increasing or decreasing such space the blasts will be caused to impinge a greater or lesser quantity of seed.

For the purpose of providing this regulation therefor, the air-supply pipe 3 is adapted to a horizontal sliding movement in a forward or rearward direction in relation to the hopper.

The mounting of the pipe 3 to provide for this movement may be effected in any suitable or convenient manner. Thus for example, as shown in Figure 5 the said pipe 3 is provided with one or more rods 19 positioned at suitable points upon its length. Each of the rods 19 is arranged to pass diametrically through the pipe, a shoulder 20 or the like being provided upon such rod to bear against one side of the pipe while a lock-nut 21 is screwed upon the extremity of such rod to clamp the rod firmly in place. The projecting portion of the said rod is slidably received within a suitable bearing or guide 22 mounted in or upon the hopper 1 and, if thought necessary or desirable, a suitable spring 23 may be provided and adapted to exert a tendency to carry the pipe in one direction or the other.

Any suitable means (not shown) will be provided to operate the rods 19 and to indicate their adjustment.

Each of the nozzles 11 is provided with a pair of plates or wings 24 (Figures 2, 3 and 6) arranged preferably immediately behind the orifice of such nozzle and adapted to divide the flow of seed to be directed towards the outlet 9 when the nozzle is in the operative position and to seat against and so close such outlet when such nozzle is in the inoperative position as above explained. Means will also be provided to move the nozzles to close the outlets when the planting devices are raised from the ground.

The reciprocal movement of the conveyor 12 (Figures 1, 2 and 4) is effected by means of a rocking lever 25 which is fulcrumed at its intermediate portion as at 26 upon a bracket member 27 or other suitable fixed point upon the structure of the implement the upper end of such lever being connected with the conveyor, while its lower extremity is provided with a knob or anti-friction roller 28 received within a serpentine groove 29 formed around the periphery of a disc 30 which is preferably mounted upon the main shaft 2 of the implement. As the shaft 2 revolves therefore, the said formation of the groove 29 will cause the lever 25 to rock upon its fulcrum and so produce the desired motion of the conveyor.

For this purpose the conveyor 12 is provided at the required point with an inverted U-shaped member 31 which projects downwards through a suitable slot formed through the seating 13 and the bottom of the hopper. Arranged between the cheeks of the said member 31 is a rod 32 provided near its upper end with a cross-pin 33 which is received within slots 34 formed vertically in such cheeks, while the lower portion of the rod 32 is telescopically received within a suitable socket 35 formed in the upper portion of the lever 23.

This construction provides the required articulation and freedom of movement in the connection of the lever to the conveyor and also permits of an adjustment of the throw or movement of the latter, inasmuch as by raising or lowering the rod within the socket the operative length of the upper arm of such lever will be lengthened or shortened, a set-screw 36 being tapped into the socket to lock the rod in place when such adjustment has been made.

If desired, however, a pitman may be attached to the rod 32 and connected with the conveyor 12 preferably outside of the end of the hopper.

In the modified form of this invention shown in Figure 7 the air supply pipe 3 is arranged within the hopper 1 and is adapted to a rocking movement for the purpose of varying the space between its nozzles 11 and the outlets 9.

In this form of the invention the conveying means, whereby the seed or material is brought into the required position between the nozzle and the outlet, consists of a series of discs 37 (one for each of the nozzles and arranged immediately beneath the latter).

Each of the said discs 37 (Figures 7 and 8) is provided with a vertical stem or spindle 38, revolvably carried in a suitable bearing or bearings. The disc itself is sunk flush with the bottom of the hopper as here shown and its upper surface is slightly dished in order that the seed or material may gravitate towards the centre where it will be impinged by the blast from the nozzle.

In order that they may convey a constant supply of seed or material to the required position between the nozzles and the outlets, the said discs 37 are adapted to turn axially with a rotary or oscillating motion.

As here shown this is effected by providing each of the spindles 38 with a small gear-wheel or pinion 39 the teeth of which are adapted to intermesh with those of a rack-rod 40 slidably mounted in a suitable guide 41 extending parallel with the hopper and actuated from the main shaft 2 with a reciprocal motion, similar to that of the conveyor 12 in the previous form, or it may be operated by a series of knee irons instead of the rack and pinions.

In the case where the disc 37 operates with a continuous rotary motion the rack-rod 40 will be replaced by a shaft rotated by the drill mechanism and connected by bevel gearing or the equivalent with the spindles 38.

For the purpose of stirring the material in the hopper and so ensuring a regular action, each of the discs 37 is preferably formed or provided, at or near its periphery, with a plurality of small upwardly disposed projections 42.

In this form of the invention, in place of the hood 14 of the previous form, the means for shielding the outlets 9 and for regulating the supply of seed to the point at which it may be impinged by the blasts, consists of a series of plates 43 (one for each of the nozzles).

Each of the said plates 43 is adjustably attached to the side of the hopper but extends beneath the pipe 3 so that the tail portion of such plates projects horizontally behind and to the sides of the nozzles for a suitable distance as here shown. The method of adjustably mounting the plates 43 is similar to that already described in connection with the hoods 14 and consists of a bolt 44 passing through a vertical slot 45 in the plate 43 thus permitting of the plate being raised or lowered in relation to the bottom of the hopper or the conveyors and this adjustment may, if so desired, be provided by other means. In the portion of the plate 43 beneath the pipe 3 is provided a slot 46 to permit of the nozzle projecting therethrough and turning slightly with the pipe 3 in the manner already explained. In this form of the invention also the nozzle is provided in rear of its orifice with wings similar to those described in the previous forms and adapted to serve the same functions.

In accordance with the usual practice also at present employed in drills and the like, suitable clutch gear will be provided to throw the blower 4 and the disc 30 into or out of gear as the coulters are lowered into the ground or raised therefrom.

It should be noted that for many purposes the air blasts may not be necessary the feed taking place solely by gravity and by the action of the conveying means moving the seed under the shields. When air is not being used the nozzles simply perform the functions of control and cut off means, being adjusted to vary the feed or to cut it off altogether just as when the air is used.

I claim:

1. In a seeding machine, the combination of a hopper having an outlet; a shield over the outlet; conveying means adapted to draw seed under the shield; and an air nozzle adapted to blow seed drawn beneath the shield through the outlet.

2. A seeding machine constructed as set forth in claim 1 provided with means for adjusting the position of the air nozzle relative to the outlet to regulate the quantity of seed sown.

3. In a seeding machine, the combination of a hopper having an outlet; a nozzle adapted to deliver a blast of air across the bottom of the hopper for the purpose of discharging seed or other material into said outlet; and means whereby said nozzle may be moved to any desired position across the bottom of the box for the purpose of regulating the quantity of seed or material to be sown.

4. In a seeding machine, the combination of a hopper having an outlet, an air nozzle adapted to discharge seed or other material into said outlet; conveying means adapted to carry such seed or material into the required position to be so discharged; and a hood enclosing sufficiently said outlet and its corresponding air nozzle in each case, said hood being adjustable in a vertical direction for the purpose of regulating the said admission by the conveying means of seeds to the said position of discharge.

5. In a seeding machine, the combination of a hopper having a series of outlets; conveying means adapted to deliver the seed or other material in front of said outlets; a movable air pipe extending from end to end of said hopper; and a series of nozzles carried upon said air pipe and adapted to move to any required position across said conveying means.

6. In a seeding machine, the combination of a hopper having a series of outlets therefrom; a series of nozzles corresponding with said outlets and adjustable in relation thereto; and wings on said nozzles adapted to close and open said outlets.

7. In a seeding machine, the combination of a suitable air blower; a hopper; an air pipe running lengthwise of the latter and connected with said blower; a series of seed outlet openings in said hopper; a corresponding series of nozzles connected with said air pipe and adapted to deliver blasts of air towards said seed outlets; covers over said nozzles and outlets; and conveying means adapted to carry the required amount of seed or material between said nozzles and outlets.

8. In a seeding machine, the combination of a hopper and a series of seed outlets therefor; a horizontal air pipe provided with air nozzles adapted to blow seed through said outlets; and means for moving said pipe to vary the position of the nozzles to regulate or cut off the flow of seed or material through said outlets.

9. In a seeding machine, the combination of a hopper; seed outlets therefrom; air nozzles adapted to blow seed through said outlets; and a bar arranged in the bottom of said hopper and adapted to reciprocal motion for the purpose of carrying seed or material between the series of air jets and the said outlets.

10. In a seeding machine, the combination of a hopper; a plurality of seed outlets therefrom; shields for said outlets; and a single bar adapted to reciprocating motion for the purpose of carrying seed or material to each of said outlets.

11. In a seeding machine, the combination of a hopper; seed outlets therefor; shields over the outlets; a reciprocating conveyor by means of which seed or material is carried beneath the shields to said outlets; a seating arranged in the bottom of the hopper and adapted to slidably receive said conveyor, a slot being formed in said seating; and means extending through the slot for operating said conveyor.

12. In a seeding machine, the combination of a hopper; a fixed seed outlet from the hopper; a shield above the seed outlet; and a conveyor operating to draw seed beneath the shield to said seed outlet.

13. A seeding machine constructed as set forth in claim 12 provided with means for adjusting the shield to vary the feed of the seed.

14. A seeding machine constructed as set forth in claim 1 provided with means for vertically adjusting the position of the shield.

15. A seeding machine constructed as set forth in claim 12 provided with a cut-off device movable to and from a position to close the outlet from the hopper.

16. A seeding machine constructed as set forth in claim 12 provided with means for adjusting the shield to vary its vertical and horizontal position.

17. A seeding machine constructed as set forth in claim 10 having serrations formed on the conveyor adjacent the shields to assist in the conveying of the seed beneath the shields.

In testimony whereof I have signed my name to this specification.

THOMAS JAMES McBRIDE.

Witnesses:
CYRIL CARLYN CARTER,
SIDNEY JAMES TRELEAVEN.